US006499701B1

(12) United States Patent
Thornton et al.

(10) Patent No.: US 6,499,701 B1
(45) Date of Patent: Dec. 31, 2002

(54) SYSTEM FOR INDUCTIVE TRANSFER OF POWER, COMMUNICATION AND POSITION SENSING TO A GUIDEWAY-OPERATED VEHICLE

(75) Inventors: Richard D. Thornton, Concord, MA (US); Brian M. Perreault, Stow, MA (US); Tracy M. Clark, Bedford, MA (US)

(73) Assignee: MagneMotion, Inc., Acton, MA (US)

( * ) Notice: Subject to any disclaimer, the term of this patent is extended or adjusted under 35 U.S.C. 154(b) by 0 days.

(21) Appl. No.: 09/609,124

(22) Filed: Jul. 3, 2000

Related U.S. Application Data (60) Provisional application No. 60/142,116, filed on Jul. 2, 1999, and provisional application No. 60/143,120, filed on Jul. 9, 1999.

(51) Int. Cl.[7] .................................................. B61L 1/00
(52) U.S. Cl. ...................................... 246/194; 246/1 C
(58) Field of Search ........................... 191/10; 246/1 C, 246/8, 63 R, 122 R, 124 R, 194

(56) References Cited

U.S. PATENT DOCUMENTS

| | | | |
|---|---|---|---|
| 4,800,328 A | 1/1989 | Bolger et al. | |
| 4,836,344 A | 6/1989 | Bolger | |
| 5,242,136 A | * 9/1993 | Cribbens et al. | 246/187 R |
| 5,263,670 A | * 11/1993 | Colbaugh et al. | 246/167 R |
| 5,277,125 A | 1/1994 | DiFonso et al. | 104/292 |
| 5,293,308 A | 3/1994 | Boys et al. | |
| 5,450,305 A | 9/1995 | Boys et al. | |
| 5,467,718 A | 11/1995 | Shibata | |
| 5,517,924 A | 5/1996 | He et al. | 104/286 |
| 5,528,113 A | 6/1996 | Boys et al. | |
| 5,551,350 A | 9/1996 | Yamada et al. | |
| 5,573,090 A | * 11/1996 | Ross | 191/10 |
| 5,619,078 A | 4/1997 | Boys et al. | |
| 5,709,291 A | 1/1998 | Nishino et al. | |
| 5,821,638 A | 10/1998 | Boys et al. | |
| 5,839,554 A | 11/1998 | Clark | |
| 5,898,579 A | 4/1999 | Boys et al. | |
| 5,927,657 A | * 7/1999 | Takasan et al. | 104/297 |
| 6,089,512 A | * 7/2000 | Ansorge et al. | 104/88.03 |
| 6,225,919 B1 | * 5/2001 | Lumbis et al. | 340/933 |

* cited by examiner

*Primary Examiner*—S. Joseph Morano
*Assistant Examiner*—Frantz F. Jules
(74) *Attorney, Agent, or Firm*—David J. Powsner; Nutter McClennen & Fish LLP (57) ABSTRACT

Inductive transfer methods and structures combine, in a single system, at least two of the three functions of transferring power, communicating data, and sensing position with a vehicle on a guideway. A set of conductors is installed on the guideway to inductively couple a multiplicity of diverse signals with a corresponding set of conductors on the vehicle. The vehicle may be moving or stationary, and signals may be coupled in one or both directions. Coupling is effected without direct electrical contact, through a common region or gap, and the structures provide suitable and precise air gap control for the conductors effecting coupling of each signal. In addition, the windings are arranged with a topology and/or symmetry to cancel crosstalk between different signals.

76 Claims, 5 Drawing Sheets

SYSTEM FOR INDUCTIVE TRANSFER OF POWER, COMMUNICATION AND POSITION SENSING TO A GUIDEWAY-OPERATED VEHICLE

This application is related to and claims the benefit of priority of U.S. Provisional Patent Application Serial Nos. 60/142,116 (Jul. 2, 1999) & 60/143,120 (Jul. 9, 1999).

BACKGROUND OF INVENTION

The invention pertains to guideway operated vehicles and, more particularly, to the transfer of electrical signals to a moving vehicle via electromagnetic inductance, without the need for mechanical contact between the vehicle and the guideway. The signal transferred can be used for power, communication or position sensing without deleterious interaction between the various signal.

Transferring electric power to a moving vehicle is an important problem that has been solved in many ways over more than a century of technological development. The most common method is to use sliding contacts, as is done for electric trains, trolley buses and some types of industrial material handling equipment. However, even a vehicle moving on a guideway may move a significant fraction of a meter with respect to the centerline of the guideway, affecting its signal lines or pickup positioning. Typically, a trolley bus uses poles to collect power via sliding contacts, and the contacting system must be mechanically guided separately from the way the vehicle is guided. This method is relatively inexpensive and versatile, but is not suited to very high speeds or to applications where exposed conductors or electrical sparks are not acceptable. An alternate method is to use "festoons", i.e., flexible cables. This method works well when the range of motion is limited but is not suitable for vehicles traveling long distances.

Electromagnetic radiation can be used to transfer power long distances at frequencies from microwaves to visible radiation, but this method is not applicable for vehicles that move long distances, often in tunnels or enclosed areas. Other methods have been demonstrated, such as electric arc discharge, but by far the most common alternate method is to use magnetic induction. This is a very old technology, and is the basis of expired patents and also several recent patents including: U.S. Pat. Nos. 4,800,328; 4,836,344; 5,293,308; 5,450,305; 5,467,718; 5,528,113; 5,551,350; 5,619,078; 5,709,291; 5,821,638; 5,839,554; 5,898,579 and 5,939,554.

Communication with a moving vehicle is also an important problem that has been approached in many ways. The most common method is radio communication, such as with cellular telephones or leaky waveguides, but sliding contacts and flexible cables can be used and have many of the same advantages and disadvantages as for transferring power. Inductive transfer of communication signals has been suggested, though bandwidth has proven to be a limitation.

Sensing the position of a moving vehicle is still another very common problem and one that has many solutions, each with major shortcomings. The recent implementation of the Global Position Sensing system has allowed revolutionary changes in this field, but GPS is not a universal panacea. It does not work in tunnels or in the shadow of tall buildings, and its accuracy is limited. The use of differential GPS allows position location to an accuracy of a fraction of a meter, but even this is not adequate for stopping vehicles in stations, for controlling synchronous motors or for common robotic control tasks. Inductive signal transfer has been used successfully and offers many advantages, particularly for vehicles moving on a guideway. However, some inductive transfer technologies require the vehicle to be moving in order to achieve inductive transfer, and this is not acceptable for many applications.

Typically, several of the above tasks—power transfer, communication and position sensing—must be performed for the same vehicle. For example, overhead cranes need power for operating hoists, but they also need to be move along a guideway and be controlled, so that communication must also be implemented. A system such as an Automated People Mover (APM) needs power for propulsion and could benefit from having a communication system for electronic control voice communication. Position sensing is also required for many such applications. To date, the prior art has pieced together disparate systems to accomplish these different tasks, often introducing complicating factors.

In view of the foregoing, it is an object of the invention to provide an improved system and method for powering, locating and/or communicating with a vehicle on a pathway.

It is another object of the invention to provide a simple and effective method and structure to transfer signals of different types with a vehicle on a guideway.

It is another object of the invention to provide a system and method for any of locating and/or communicating with a vehicle with a linear synchronous motor.

SUMMARY OF THE INVENTION

One or more of the foregoing desirable objects are achieved in accordance with the present invention by providing an inductive coupling structure for a plurality of signals to effect, in a single system, at least two of the three functions of transferring power, communicating data, and sensing position. In illustrative embodiments, this is done by installing a guideway winding, or set of conductors on a guideway, in such a way that a multiplicity of diverse signals are inductively coupled between the guideway winding and a corresponding vehicle winding, or set of conductors, constituting a transducer assembly that is carried by a vehicle positioned on the guideway.

Aspects of the invention achieve do-coupling between the different signals, allowing such a single-pickup implementation, aplicable to a broad range of guideway-equipment systems. The vehicle may be moving or stationary, and the signals may be coupled in one or both directions. Coupling can be effected without direct electrical contact, through a common region or gap, and the structure provides suitable and precise air gap control for the conductors effecting coupling of each signal. In addition, the windings can be arranged with a topology and/or symmetry to reduce crosstalk or minimize interference between different signals. Aspects of the invention employ patterned conductors on one or more circuit boards to define either or both of the transducer and guideway windings, thus achieving a modular and precise construction.

The coupling conductor or winding for one signal can create a symmetric, periodic or antisymmetric flux pattern that induces at least partially self-canceling and preferably a substantially nulled, signal in the coupling conductor or winding for a different signal. The coupling system arranges sets of inductively coupled conductors with a symmetry that permits two or all three of these signal coupling functions to be done simultaneously with a single transducer structure while avoiding crosstalk or deleterious coupling between the different functions. Preferred implementations utilize conductive patterns on a circuit board, and the board may be shaped to interfit with the mechanical or magnet structure of a linear motor to provide a modular and effective pathway-vehicle system.

Inductive power transfer is preferably carried out at a frequency on the order of ten to fifty kHz at relatively high power levels, typically many watts or even kilowatts or megawatts. The data communication is effected with signal energy of a higher frequency, typically greater than about one MHz, and may involve power levels on the order of a watt, or even less. Inductive position sensing can be done with carrier frequencies that cover the whole range used by both power transfer and communication. The inductive transfer structure of the invention places diverse ones of these signals on a common magnetic structure such that two or more of the signals are effectively multiplexed or simultaneously coupled without mutual interference.

The frequency differences may allow processing techniques such as filtering and demodulation to be of some use in separating different signals, but inductive coupling necessarily creates stray fields, and these present a primary obstacle to inductively coupling plural signals across a localized region, particularly when these include power signals. Aspects of the invention employ symmetry in different forms to achieve cancellations of unwanted signals. The symmetry arrangements may include methods or structures wherein conductors for signals of a first type are arranged and positioned so tho fluxes they generate are oppositely-directed in the vicinity of the coupling conductors for signals of a second type, where tie second coupling conductors are arranged in crosstalk-canceling pairs. Aspects of the invention also contemplate serpentine or zig-zag cult windings that define a periodic pattern of flux regions of alternating polarity, simple loop windings, and multiply-connected or figure-of-eight windings that may be placed in shifted or aligned positions, or otherwise arranged to induce desired signals or null undesired signals. Specific illustrative examples are discussed below.

An aspect of the invention provides for fabricating the inductive coupling systems of the invention using printed circuit technology to define non-interfering winding patterns. This allows precise and relatively complex winding configurations to be made inexpensively on a printed circuit board. Alternate aspects accommodate two or even all three of the desired functions, and may offer improved performance of individual functions beyond the combination of signal coupling. For example, in one important application, position of a vehicle is detected with very high precision, which may be to an accuracy on the order of a micrometer, by manufacturing position coupling conductors on a printed circuit with high precision windings and with registration features that define position with very high accuracy. By sensing the temperature of the circuit board, correction for position errors due to thermal expansion ad contractions of the board may further increase the precision.

In a system combining position sensing with high-speed digital communication, such a printed circuit can be fabricated with additional windings implemented as conductive lead patterns that allow high frequency carriers, modulated by communication signals, to be inductively coupled while nulling interactions with the position sensing conductors.

In another system that transfers power signals at a level of several watts, the power transfer winding can be constructed on a printed circuit board with a conventional etched metallization. For a system of higher power level, i e., carrying a current level greater than the capacity or rating of a conventional printed circuit, a wire winding is bonded to the circuit board substrate, and the board portion provides support and interconnect capability.

The different types of conductor patterns may all be on a common board, or may be on separate boards. Further, the guideway conductor assembly, the vehicle conductor assembly, or both may be entirely or partly implemented as circuit board patterns.

In yet another aspect, the position sensing assembly may be incorporated in and used for control of a linear synchronous motor. A printed circuit may advantageously be formed with cut-outs or slots to adapt the entire printed circuit board to fit in the slots of the iron stator of the linear motor, which thus provides a defined gap and ferromagnetic flux coupling elements for coupling windings on the board to couple position signals.

The foregoing and other aspects of the invention are evident in the drawings and in the text that follows.

BRIEF DESCRIPTION OF DRAWINGS

Methods and structures of the invention for effecting multiple different inductive transfers, and the efficiencies and advantages of their construction and operation, will be better understood from the discussion below, taken together with the drawings showing illustrative embodiments and representative details of implementation, wherein.

DETAILED DESCRIPTION OF ILLUSTRATED EMBODIMENTS

Figure 1:
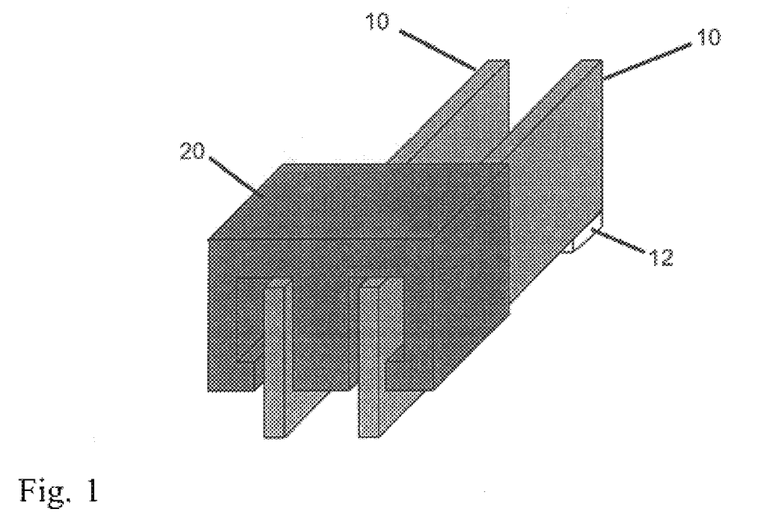
FIG. 1 is a simplified illustration of a power transfer system of the present invention.

The invention contemplates systems of enhanced utility for guideway systems. Electrical signal transfer is achieved by placing an inductive pickup device 20 in close proximity to a winding which has been constructed in the form of a transmission line 10 as shown in FIG. 1. The polarity of the transmission line currents alternate so there is a changing flux, which induces voltages into pickup windings that are closely coupled to the transmission line by virtue of a magnetic core. In general, applicant contemplates that the transmission line runs along a vehicle pathway, and the device 20 is carried by the vehicle and aligned with the transmission line to couple signals therewith.

This inductive transfer system can be analyzed by classical methods, which are described in many text books on transmission lines, transformers, power electronics and digital signal processing. The induced AC voltages are usable for many purposes. Communication signals are transmitted by modulating a high frequency carrier with the digital signal. In the various embodiments of the invention, the communication signal is transmitted over a different winding than is used for power, and the topology of the windings is such that there is very little magnetic coupling between the power and communication circuits. Position sensing is done by means of a preferably multiphase winding that crisscrosses laterally through the communication winding region. The amplitude of the signal on this winding may be used for communication while the phase can be used for position sensing.

FIG. 1 is a simplified drawing of one approach to inductive power transfer illustrating the signal decoupling of the present invention. A transmission line 10 carries current and is straddled by a ferromagnetic pickup 20 that couples a magnetic field from the transmission line into the core. Windings on the core, not shown, create voltages that are used for many purposes. A cross bus 12 may connect one or more conductors in one rail of the transmission structure 10 to corresponding wires within the other rail so they form a common transmission winding or current path. One arrangement of current paths or windings is shown in the cross sectional view of FIG. 2, which is taken across a structure as shown in FIG. 1 but with a specific enclosed winding structure revealed.

Figure 2:
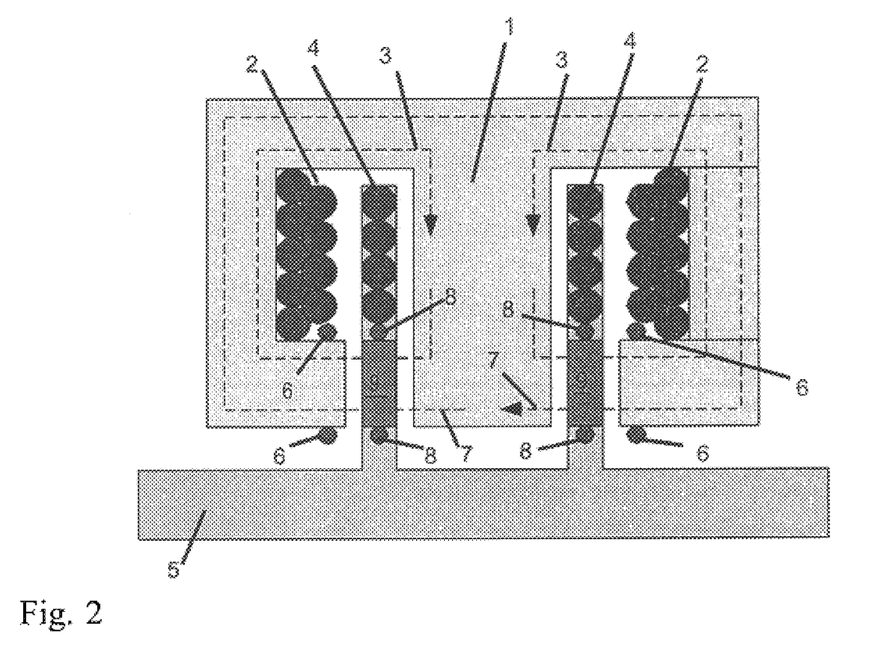
FIG. 2 is a cross sectional view of a system as shown in FIG. 1.

Power, communication and position sensing signals may all be transmitted on a transmission line as shown in FIGS. 1 and 2. The line 10 can have several sets of conductors, each of which may have a different, structure, layout or topology as discussed further below. For power transmission the wires have relatively large cross section area in order to handle substantial currents. For communication the wires are smaller, and they are disposed so as to not interact with the power winding. For position sensing a winding is preferably constructed as a multiphase winding, with successive windings each offset, in a manner similar to those used in linear motors. The pickup or transducer 20 carried by the vehicle aligns corresponding power, communication and position windings to couple with the transmission line.

FIG. 2 shows a cross section of the system schematically illustrated in FIG. 1, with one winding structure of the present invention. The transmission line 10 (FIG. 1) includes a set of conductors, including windings 4 and 8, which are long in a direction perpendicular to the plane of the figure. These are inductively coupled into corresponding windings 2 and 6 that reside on a ferromagnetic structure 1 in the body of the pickup or transducer device 20 (FIG. 1) that straddles the transmission line 10. While illustratively the structures 10, 20 have been referred to as a transmission line and a pickup, the coupling is bidirectional, and the various windings can be excited so as to achieve inductive transfer of power and communication signals in either direction. Typically, power will generally be transferred from a fixed or stationary structure, such as conductors on a guide way, to a subsidiary pickup located on a vehicle, robot, moving platform or the like, while data signals or position signals may be generated on, and may be coupled from, either side to the other.

According to an important aspect of the invention the flux patterns set up by one signal conductor are such that a symmetry or anti-symmetry nulls or reduces interference induced in the conductor coupling another signal. In the embodiment of FIG. 2, the power transfer current in primary winding 4 sets up flux pattern 3 that induces a voltage in secondary winding 2. For communication or position sensing a current in primary winding 8 creates flux pattern 7 that induces a voltage in secondary winding 6. As seen in FIG. 2, the flux pattern 3 of the power winding includes two oppositely-directed (or substantially symmetrically opposed) flux patterns. As illustrated in FIG. 1, bus 12 connects the power conductors 4 of the left rail to the power conductors 4 of the right rail. Thus, if the current direction of one conductor of the set is directed into the page, the current flow in the other is out, and the magnetic fields around the two power conductors are clockwise and counterclockwise. Thus, because of the symmetrical arrangement of the two sides of the communication windings 6 and 8, the stray flux from the power winding does not induce a net voltage in the communication windings and vice versa. If perfect symmetry were present there would be no coupling between the two modes. In practice the coupling is, at most, a few percent of what it would be if both signals created the same flux path. Preferably, the two opposed structures are arranged to keep the gaps between the stationary structure 5 and the moving transducer core as small as possible, so that the inductive transfer works with maximum efficiency.

FIG. 2 also shows ferromagnetic components 9 in the stationary structure. These components allow the flux in the pickup coil to pass more readily through the primary support structure 5. This reduces the magnetic energy storage in the gaps between the transducer 20 and the transmission structure 5 and this, in turn, increases the efficiency of inductive signal transfer. These stationary ferromagnetic components 9 add somewhat to the inductance of winding 4 in regions where there is no pickup, but they also increase, by a large amount, the magnetizing inductance of the pickup transformer and this increases the efficiency of power collection. These ferromagnetic parts can, however, be omitted in embodiments where it is more economical to tune out the reactive energy with a capacitor on the pickup.

The power winding can be constructed in many ways. FIG. 2 shows a construction with four turns of round wire on the primary 4 and nine turns of wire on the secondary 2. In a practical design, the number of turns in the primary is determined by the voltage of the AC source, and the number of turns in the secondary is determined by the load voltage. This presents considerations similar to a conventional transformer, except that there is a large external inductance due to the transmission line, and the magnetizing inductance of the transformer is smaller than in a classical transformer. The number of turns can be any value from one to several hundred, but, because of the relatively high frequencies used for power transfer, typical designs require less than ten turns for each winding.

As with all transformers, power and other signals can be transferred from the secondary to the primary as well as from the primary to the secondary windings. This allows power and communication signals to be transferred from the stationary part to the moving part and vice versa. Accordingly, in various embodiments of the invention involving guideway/vehicle signal coupling systems, applicant contemplates that any of the signal may originate on either the line 10 or the transducer 20, and be coupled to the other. Furthermore, both the guideway system and the vehicle system may have circuitry or microprocessors for implementing communications protocols, and for initiating, composing, receiving or replying to data communications.

In most cases of power transmission, the wire diameter is large enough and the electrical frequency high enough that it is necessary to use stranded Litz wire in order to reduce power loss in the wire due to induced eddy currents. Rectangular Litz wire may be used in order to fit more conducting area into a given space in the pickup. The optimum size and type of construction of the Litz wire can be determined using guidelines published by the manufacturers of the wire.

In the case of position sensing, the primary winding may be constructed as a multiphase meander winding so that the coupling changes periodically as the vehicle moves along the guideway.

Position sensing can be done by replacing a simple straight communication winding such as windings 6 and 8 of FIG. 2, with a winding structure such as shown in FIGS. 3A and 3B. In FIG. 3A a "figure-of-eight" transducer winding 21, i.e., a conductor having a clockwise loop adjacent and connected to a counterclockwise loop, is excited with an AC source so as to couple magnetic energy into the multi-loop winding 13 and thereby produce an AC voltage at terminals connected to the winding 13. This Figure is drawn as though the winding 13 were constructed on a printed circuit board, and the wiring or conductor segments on the bottom of the board are shown as dashed lines.

When a current is applied to the transducer winding 21 it will create magnetic flux lines perpendicular to the plane of the coil, and in opposite directions in its first and second loops. These loops have the same length or spatial period as the winding period of winding 13, which itself appears, in projection, as a series of alternating-sense current loop segments. The flux generated by winding 21 will be oppositely directed, into and out of the plane of the page, in the two loops of the winding. Thus, when the figure-8 transducer winding 21 is substantially aligned with the projected loops formed by the serpentine winding 13, the signals induced by the two transducer loops are additive. As the transducer winding 21 moves along the guideway and shifts its alignment with respect to the fixed winding 13, the signals induced in winding 13 progressively cancel, resulting in a periodic nulls that indicate position along the guideway.

Thus, transducer winding 21 is mounted on the vehicle and as it moves to the left or right the induced AC voltage in the winding 13 will change in amplitude and phase, and will go through a complete oscillation for each motion of one wavelength of the zig-zag winding 13, indicated by interval W in the drawing. In operation as a position sensing system, the induced signal is processed, and the number of wavelengths is counted, for example, by counting the number of signal nulls, to determine the coarse position along the guideway, while the normalized magnitude of the AC voltage $V_a$ induced in winding 13 indicates the phase or fine position of the winding 21 along the guideway.

In order to improve the performance, preferably a multiphase winding, such as the one shown in FIG. 3B is used. In this design there are two position-indicating phase windings, 13a, 13b, and the induced voltage signals $V_a$ and $V_b$, and their relative amplitudes can be used to resolve the position of the transducer between zeroes to determine the position of transducer along the windings with high accuracy. Preferably the transducer windings are wound on a ferrite core to improve the coupling between the vehicle transducer and the position sensing winding. Also multi-turn windings may be used for either or both of the stationary winding or the transducer winding. The phase windings may be the primary windings, and the signals carried by the multiphase winding may be multiplexed, or may be of different frequency in each phase winding, to allow the transducer output to be demodulated or processed into a distinct signal for each of the phase windings.

Figure 4:
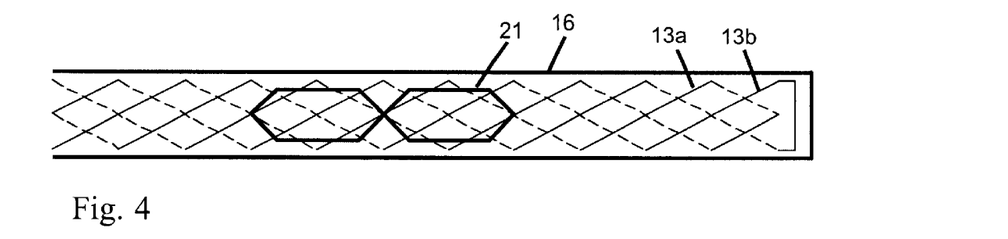
FIG. 4 an embodiment with an additional guideway winding for effecting both communication and position sensing.

For coupling both position signals and data communication signals, a conductor assembly constituting a combination winding is used, of which one example is shown in FIG. 4. An outer winding 16 carries the communication signal and the inner multiphase windings 13a, 13b carry the position signal. If there are an integer number of wavelengths in the position sensing winding then there will be no net cross coupling of signals between communication signal and the position sensing signal. In addition, substantially different carrier frequencies are preferably employed for these two signals, allowing filtering or demodulation processing to further reduce cross coupling. Other methods, based on symmetry, can be used to further reduce cross coupling.

Power Transfer and Control

Figure 5:
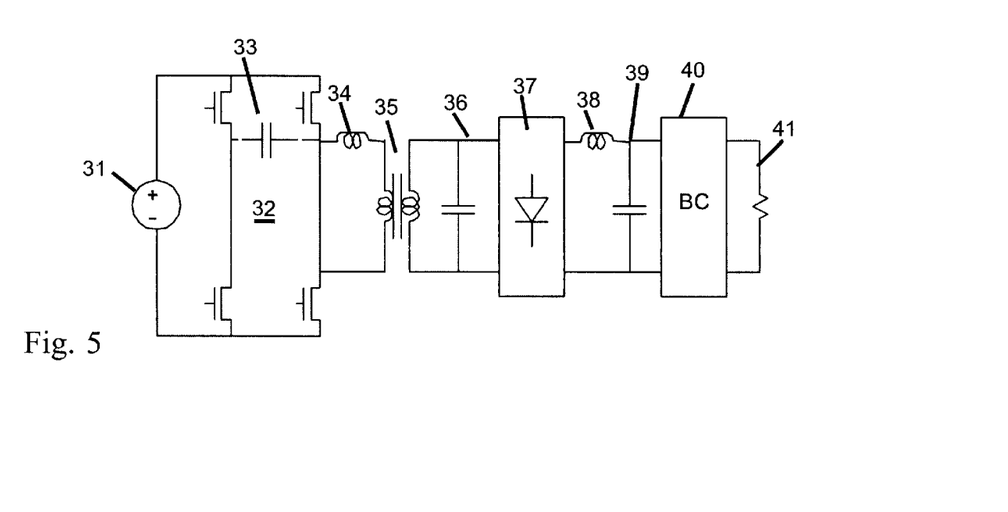
FIG. 5 illustrates a circuit for power transfer operation with the structure of FIG. 2.

FIG. 5 shows a circuit model for a system transferring power as illustrated, for example, in FIG. 2. A DC voltage source 31 is converted to an AC (e.g., alternating square wave) current by semiconductor power devices 32. The AC power signal energizes a transmission line that runs along the vehicle guideway. The transmission line is modeled by inductor 34. A capacitor 33 tunes out the transmission line and pickup inductance. The ferromagnetic pickup 35, corresponding to the core and secondary winding 1, 2 of FIG. 2, form, together with the transmission line, a primary and secondary winding (not numbered), as with a conventional transformer. The AC voltage from the pickup is rectified by diode bridge 37, filtered by inductor 38 and capacitor 39, and regulated by a buck converter 40 so as to provide a constant DC voltage to a load 41. In order to achieve reasonable efficiency and weight, the AC power transmission signal is preferably at a frequency in the range 10 kHz to 50 kHz. Lower frequencies are possible but can produce acoustical noise and may require a relatively large pickup core, while a higher frequency may result in higher losses in the core and more reactive energy in the transmission line. Preferably a ferrite pickup core is used to reduce AC losses. However, in some case other ferromagnetic materials may be preferable, such as very thin laminations of silicon steel.

The invention contemplates many possible variations on the design in FIG. 5. For example, the series tuning capacitor 33 can be replaced by a direct shunt or short circuit, with the reactive power then provided by the DC source through the transistor switches. The parallel tuning capacitor 36 may be omitted in some cases, particularly when the power levels are relatively low. Also, in cases where there is only one inductively coupled load, the regulator may be omitted, and power control may simply be effected at the inverter or AC power source 31, 32.

Figure 6:
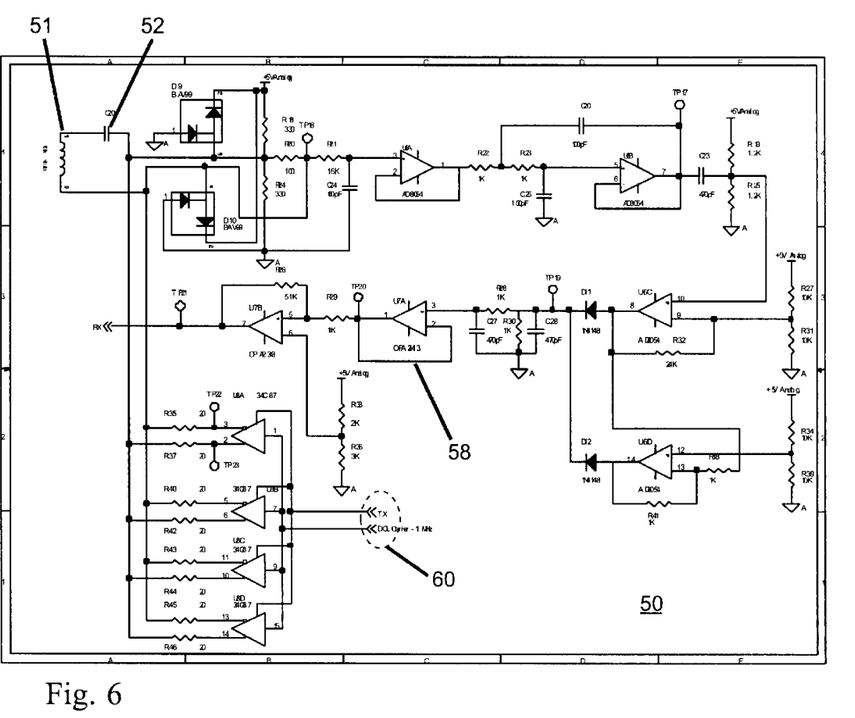
FIG. 6 illustrates a circuit for digital data interfacing with the guideway and transducer systems of the present invention.

FIG. 6 shows an interface circuit 50 for converting the communication signal voltage induced in a receiver winding or transducer to a digital signal suitable for supplying data input to a microprocessor. The winding illustrated at 51 is coupled through capacitor 52 to a detection circuit. The induced signal is preferably at a frequency over one MHz, and the capacitor 52 is small enough to substantially block any lower frequency component induced by the power signal that may be present. The remainder of the circuit, which may be conventional, performs functions of clipping, amplification, detection and wave shaping. The clipper removes any spikes produced by the power signals. One or more band pass filters provide additional filtering, and a detector or signal demodulation circuit removes the digital signal from its high frequency carrier. Additional filters create a digital signal which is then level shifted and shaped to produce a digital signal output at 58 which can be used by a microprocessor. To transmit communication signals 60 in the other direction, for signals going from the vehicle to the transmission line, the digital signal is passed through four paralleled line drivers to produce a signal that passes through the capacitor 52 onto the winding 51, i.e., the receiving winding. Similar circuitry can be used at other points along the transmission line to send or receive digital signals.

Position Sensing

Figure 7:
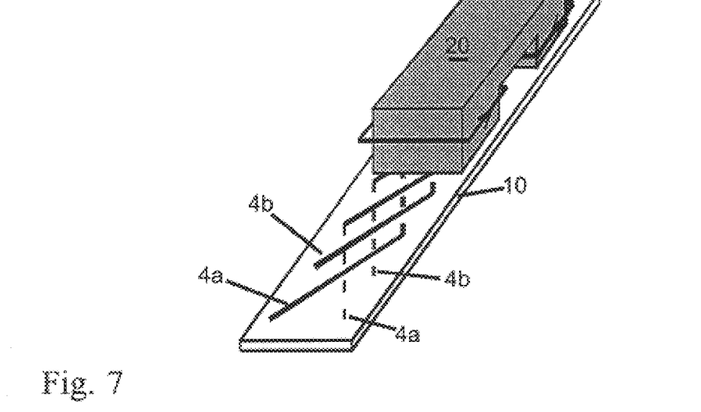
FIG. 7 illustrates another transducer and system of the present invention.

As noted above, position sensing is implemented using one or more meander windings laid out so that the signals they induce in a transducer receiver winding, or the signals they receive when the transducer winding is actuated, reflect the position of the transducer. The figure-8 winding of FIGS. 3A and 3B advantageously develops an additive induced signal with periodic nulls along the guideway, and the signals induced when it lies adjacent the position winding have enhanced amplitude with the transmitting and receiving loops are aligned with each other, and nulled amplitude when they reside in a mid-phase position with respect to each other. A preferred implementation of such regular, multiphase zig-zag or serpentine windings may be effected by forming the winding pattern as a patterned printed circuit board, as shown in FIG. 7. If the power requirements are low enough that pickup assembly 20 can interact with currents on the PC board to deliver power to the vehicle, then the multiphase windings 4a and 4b may be used to transfer power.

Figure 9:
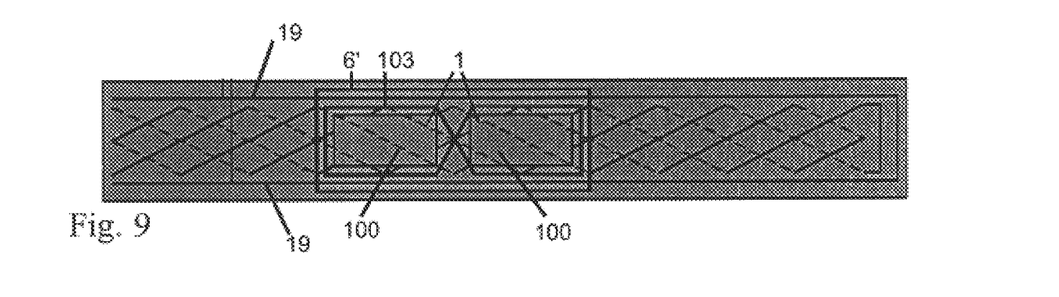
FIG. 9 illustrates another embodiment.

If communication signals are also required to be coupled, the configuration of signal conductors shown in FIG. 9 can be used with a communication winding 19 extending along the guideway used for inductively coupling communication signals as discussed above between the PC board conductor assembly, and the pickup 20. In this case, the pickup transducer 20 includes a communications conductor configured as a loop 6' which is aligned with guideway loop 19 and substantially surrounds both loops of the winding 21. By arranging that the communications conductor 6' has a length that at least covers the figure-eight winding 103 and is an integral multiple of the period W, currents induced by signals in both the zig-zag position winding or winding 103 are substantially eliminated.

FIG. 7 shows another approach to combining inductive signals. Magnetic transducer 20 moves in a line above a long, narrow guideway printed circuit board 10. The transducer is wound with winding 23 that interacts with the windings 4a and 4b on the circuit board to achieve induced magnetic effects such as position sensing, communication and power transfer between the windings on the board and the windings on the transducer.

When more substantial power transfer is required as well as position sensing and communication, a PC board such as the one in FIG. 10 and discussed further below, can be used in the structure shown in FIG. 1. In this case several parallel conducting paths 111 are used to handle the higher current without engendering excessive eddy current loss. The ferromagnetic pole elements of the pickup assembly are split, as shown by 100, and positioned in the loops of a figure-eight winding to allow position sensing as described above, as well as corresponding conductor windings 6', 19 for non-interfering data communication.

The printed circuit board implementations described herein are particularly advantageous at lower power levels where they can be used to simplify the construction 30 and reduce cost. In this case electromagnetic inductive transfer is achieved by placing an inductive transducer in close proximity to an assembly of conductive windings that has been formed or constructed on a printed circuit board. The printed circuit portion may reside in the stationary structure, the movable vehicle transducer, or may be employed in the fabrication of both. Furthermore, signals or power can be transferred in either direction, and position sensing can be accomplished, with all three functions carried out using a single PC board transducer across a common gap. The crosstalk-nulling symmetry arrangement of windings allows larger, full-length windings to be employed on the vehicle transducer for all signals, facilitating effective alignment and enhanced signal strength.

With reference to FIG. 7, for position sensing the vehicle has a transducer 20 that creates an AC magnetic field that interacts with a printed circuit zigzag winding 4a and 4b so as to produce a guideway signal that can be analyzed to determine the vehicle's position. In multi-vehicle systems, this position can then be transmitted back as data to any vehicle on the guideway. When there are multiple vehicles on the guideway, then their positions can also be determined by arranging that each position transducer is actuated with a position signal of a different carrier frequency. The position-indicating signals induced in the zig-zag guideway winding are then demodulated at each of the carrier frequencies to form respective position-indicating signals for all of the vehicles.

Figure 8:
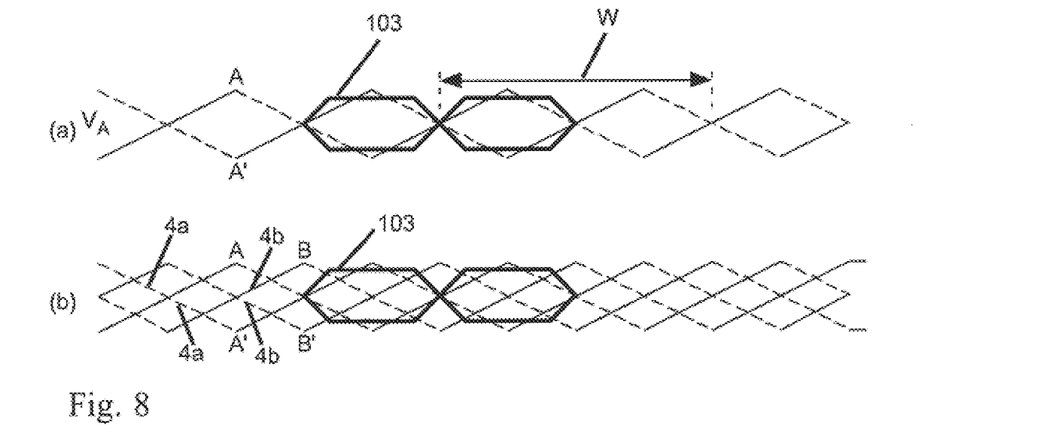
FIGS. 8A and 8B are top views of the system of FIG. 7 in a single phase and a multi-phase position sensing system, respectively.

Position sensing is done via the interaction with a transducer, such as 100 in FIG. 8(a), with a circuit board pattern such as the one shown in FIG. 8. The coarse position is determined by counting zero crossings in the multi-phase signals in windings 4a and 4b, while the fine position is determined from the phase of the signal. In this design there are two induced voltages in the windings 4a and 4b, and their relative amplitudes can be used to determine the position of transducer 100 with high accuracy. In practice the winding 103 is wound on a ferromagnetic core so as to improve the coupling between the vehicle transducer and the position sensing winding. Also, it may be desirable to use multi-turn windings for either or both of the stationary winding or the transducer winding.

Communication

In cases where both position sensing and communication are required, a combination winding is used, such as shown in FIG. 9. An outer loop winding 9 surrounds the phase windings 4a, 4b and carries the communication signal, whereas the inner multiphase windings 4a and 4b carry the position signal. By providing an integer (preferably even) number of wavelengths in the position sensing winding, applicant arranges that there will be no net cross coupling of signals between communication and position sensing functions. In addition, the carrier frequencies used for these two signals can be substantially different so that band pass filters can be used to further reduce cross coupling.

FIG. 8 shows a view looking down on the printed circuit in FIG. 7. In FIG. 8(a) the "figure-of-eight" transducer winding 23 is excited with an AC source so as to couple magnetic energy into the multi-phase winding 4 and thereby produce an AC voltage at terminals connected thereto. The windings 4a, 4b are constructed on a printed circuit board, and the wiring on the bottom of the board is shown as dashed lines. The conductors on the two sides of the circuit board are connected by means of though-hole connections. Transducer winding 103 is mounted on the vehicle and as it moves to the left or right the induced AC voltage at 6 will change in amplitude and phase. It will go through a complete oscillation for each motion of one wavelength, indicated by 8 in the drawing. In FIG. 8(b) two windings 3 and 4 are used to effect a two-phase position-sensing signal.

Figure 3:
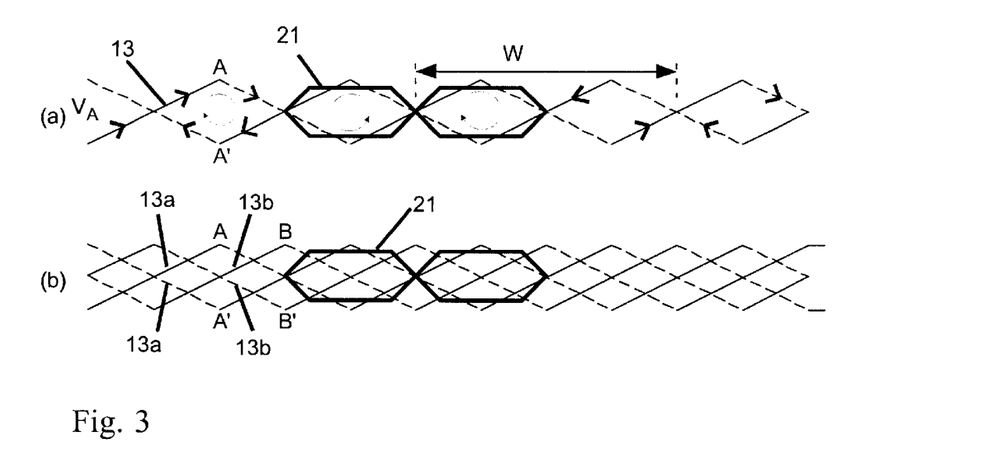
FIGS. 3A and 3B illustrate figure-of-eight transducer embodiments with two different guideway windings.

Communication and power signals can both be transmitted over the same loop, such as the outer loop 16 in FIG. 3, but it is often preferable to transmit power and communication signals on separate, non-interacting loops. One way to do this is to use the structure of FIG. 1 and use two printed circuit boards for inductively coupling signals. This creates a different flux pattern for the power transfer than for the communication signals.

FIG. 9 shows the addition of a communication windings 19, 10 to the circuits of FIG. 2. The winding 10 on the pickup transducer has twice the length of the position sensing winding 103 so that there is negligible net coupling of magnetic energy between winding 10 and windings 4a, 4b.

Figure 10:
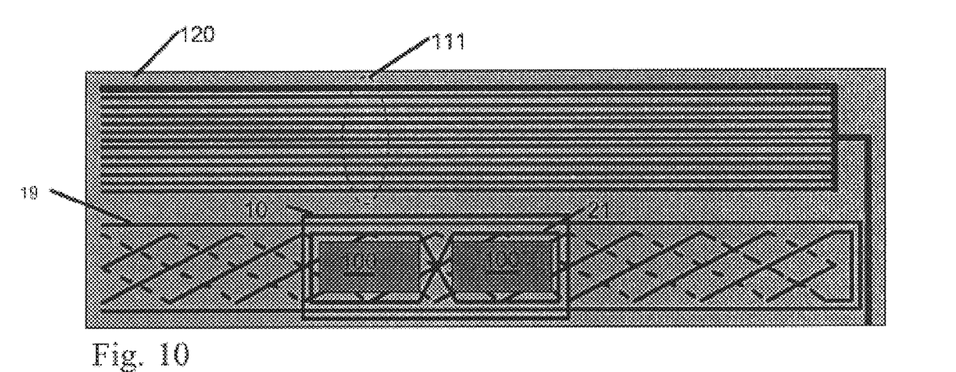
FIG. 10 illustrates a printed circuit board configured to form a transducer as shown in FIG. 1.

FIG. 10 shows a printed circuit layout suitable for use with the structure of FIG. 1. The lower part of the board is similar to the position/communication board of FIG. 9, and is laid out to interact with flux in the air gap of the transducer 20 shown in FIG. 1. The poles of the transducer are split so as to accommodate a figure-of-eight winding. The upper winding or lead pattern 111 in FIG. 10 carries relatively large current and creates a flux through the center core of the transducer. The power winding consists of a multiplicity of printed wires so as to minimize eddy current loss in the wires. The power windings on each of the two boards are interconnected via the connector bus or board 12 (FIG. 1) so as to form a complete loop. The power winding 111 in the patterned board design of FIG. 10 is suitable for power levels of several watts, but probably not more than a hundred watts because of the relatively low current cross-sectional area of the conductor on the circuit board. For very high power levels, rather than using a conventional lithographic patterning process applied to a relatively thinly metallized board, or multilayer board with through connections, it is preferable to use a bundle of finely stranded Litz wire to carry the current as discussed above. In this case the wire can be bonded to the circuit board in the desired lead or winding pattern, and the circuit board can then provide part of the support for the power winding and the interconnections.

Example Adapted to Linear Motor Position Sensing

Figure 12:
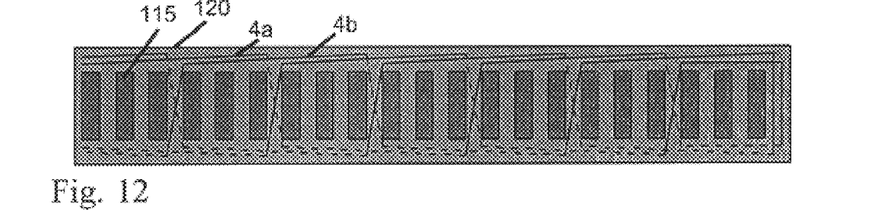
FIG. 12 illustrates a winding pattern of the embodiment of FIG. 11.

The invention is advantageously implemented in embodiments for position sensing and control of a linear synchronous motor (LSM). In this case it is essential that the position sensing be accurately aligned with the motor winding, which is typically wound in slots in a ferromagnetic structure. In preferred embodiments, applicant achieves enhanced alignment by configuring the inductive transfer winding on a printed circuit board, and forming the board itself with notches, holes or edges that mate with the pole, core or other structure of the motor itself. For example, alignment is achieved in one embodiment by using a printed circuit board with slots that pass over the teeth of the LSM stator. Many implementations are possible to construct the position sense winding. One layout is shown in FIG. 12. Here there are two phase windings, each with one turn. The position sensing winding is, by way of example, constructed with a pole pitch that is twice the pole pitch of the LSM so as to eliminate cross coupling between the motor and position sensing windings. In practice a larger number of turns would be used than the single turn indicated in the Figure so as to increase the signal level.

Figure 11:
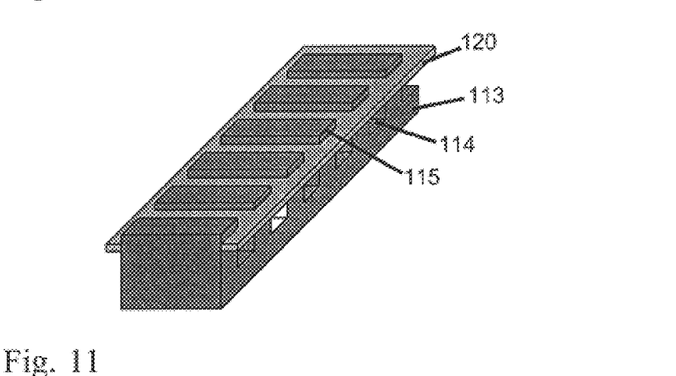
FIG. 11 a long stator linear synchronous motor embodiment of the invention.

FIG. 11 shows the stator of a long stator linear synchronous motor (LSM). A ferromagnetic core 113 is constructed with slots 114 and teeth 115. The slotted printed circuit board 120 mounts inside the slots above the power winding in the slots; the power winding is not shown.

FIG. 12 shows the winding on the printed circuit board 120 of FIG. 11. The board 120 includes windings 4a, 4b for indicating position. This winding and board may be similar to the board shown in FIG. 9 except that the board is designed to fit in the slots of the motor. Multi-turn windings can be constructed in this same way.

By creating patterned windings on boards, applicant is able to construct the linear motor in a modular and simplified fashion, and the windings may be made for drop-in assembly while achieving a high degree of precision yielded by lithographic processes. The resulting construction is applicable at many levels of scale, from micro- or mini-motors, to production line robotic equipment, warehouse vehicles and large gantry equipment. Furthermore, in devices where position sensing resolution, or the complexity or size of data communication is critical, the boards may themselves incorporate circuit elements to effect signal processing or provide additional functions, and for certain signals or tasks, such circuitry may be self-sufficient so that separate interfaces, adapters or communication or control systems are not required. Further precision of the position signal system may be achieved by placing a temperature sensing element on the circuit board to provide temperature signals for processing to effect dimension corrections for thermal expansion and further refine the position phase interpolation. The boards may be formed with rigid board technology, or may be implemented using flexible board materials to accommodate different application or mounting constraints.

The invention being thus disclosed and illustrative embodiments described, further variations and modifications will occur to those skilled in the art, and all such variations and modifications are considered to be within the scope of the invention, as defined by the claims appended hereto and equivalents thereof. Such embodiments have particular utility, by way of non-limiting example, in coupling signals with a linear synchronous motor such as described in U.S. Pat. No. 6,011,508, issued Jan. 4, 2000. The disclosure and teachings of that patent and patent application are hereby incorporated herein in their entirety by reference.

What is claimed is:

1. A system for transfer of electrical signals with a movable vehicle, the system comprising first and second pathway conductor sets disposed along a way upon which the vehicle travels, first and second vehicle conductor sets carried by the vehicle, said first pathway conductor set and said first vehicle conductor set being inductively coupled with respect to a first signal, said second pathway conductor set and said second vehicle conductor set being inductively coupled with respect to a second signal, at least one of said pathway conductor sets and said vehicle conductor sets being arranged with a spatial pattern that at least partially cancels coupling of the first signal with the second pathway conductor set, and coupling of the second signal with the first pathway conductor set.

2. The system of claim 1, wherein said first signal and said second signal are different ones of a power signal, a communication signal, and a position indicating signal.

3. The system of claim 1, wherein said pathway conductor sets and said vehicle conductor sets couple the first and the second signals across a common flux gap.

4. The system of claim 1, wherein at least one of said pathway conductor sets and said vehicle conductor sets includes a first winding that carries the first signal, a second winding that carries the second signal, the first and second windings being arranged with a spatial pattern that at least partially cancels coupling of the first signal with the second winding, and coupling of the second signal with the first winding.

5. The system of claim 4, wherein the first winding has a spatial period defining periodic alternating flux regions, and the second winding comprises a loop disposed such that currents induced in the second winding as a result of said alternating flux regions are cancelled.

6. The system of claim 5, wherein substantially no net current is induced in the first winding as a result of flux generated by the second winding.

7. The system of claim 5, wherein the first signal is a position indicating signal.

8. The system of claim 7, wherein the second signal is a communication signal.

9. The system of claim 8, wherein the first winding generates opposite symmetric fluxes, and the second winding is disposed in said opposite symmetric fluxes such that substantially no net current is induced therein as a result thereof.

10. The system of claim 9, wherein substantially no net current is induced in the first winding as a result of flux generated by the second winding.

11. The system of claim 9, wherein the first signal is a power signal.

12. The system of claim 11, wherein said first pathway conductor set is a stator of a linear synchronous motor.

13. The system of claim 11, wherein the second signal is a communication signal.

14. The system of claim 4, wherein the first winding generates opposite symmetric fluxes, the second winding is disposed in said opposite symmetric fluxes such that substantially no net current is induced therein as a result thereof, and the second winding has a spatial period defining periodic alternating flux regions.

15. The system of claim 14, wherein substantially no net current is induced in the first winding as a result of flux generated by the second winding.

16. The system of claim 14, wherein the first signal is a power signal.

17. The system of claim 16, wherein the second signal is a position indicating signal.

18. The system of claim 14, wherein said first pathway conductor set is a stator of a linear synchronous motor.

19. The system of claim 1, wherein the pathway conductor sets include a first winding that carries the first signal, the vehicle conductor sets include a second winding that carries the second signal, the first and second windings being arranged with a spatial pattern that at least partially cancels coupling of the first signal with the second winding, and coupling of the second signal with the first winding.

20. The system of claim 19, wherein the first winding has a spatial period effective to generate periodic alternating flux regions, and the second winding comprises a loop disposed such that currents induced in the second winding as a result of said alternating flux regions are cancelled.

21. The system of claim 20, wherein substantially no net current is induced in the first winding as a result of flux generated by the second winding.

22. The system of claim 20, wherein the first signal is a position indicating signal.

23. The system of claim 22, wherein the second signal is a communications signal.

24. The system of claim 23, wherein the first winding generates opposite symmetric fluxes, and the second winding is disposed in said opposite symmetric fluxes such that substantially no net current is induced therein as a result thereof.

25. The system of claim 24, wherein substantially no net current is induced in the first winding as a result of flux generated by the second winding.

26. The system of claim 24, wherein the first signal is a power signal.

27. The system of claim 26, wherein the second signal is a communications signal.

28. The system of claim 19, wherein the first winding generates opposite symmetric fluxes, the second winding is disposed in said opposite symmetric fluxes such that substantially no net current is induced therein as a result thereof, and the second winding has a spatial period effective to generate periodic alternating flux regions.

29. The system of claim 28, wherein substantially no net current is induced in the first winding as a result of flux generated by the second winding.

30. The system of claim 28, wherein the first signal is a power signal.

31. The system of claim 30, wherein the second signal is a position indicating signal.

32. The system of claim 1, wherein one of said first pathway conductor set and said first vehicle conductor set includes a winding having a spatial period, and one of said second pathway conductor set and said second vehicle conductor set includes a loop oriented along the path having a dimension which is a multiple of said spatial period effective to null-couple with a signal in said winding.

33. The system of claim 32, wherein said winding carries a position indicating signal and said loop carries a communications signal.

34. The system of claim 1, wherein said first pathway conductor set includes a pathway position winding having a spatial period, and said first vehicle conductor set includes a vehicle position winding having the same spatial period and including first and second turns of opposed sense, such that a signal in the vehicle position winding induces a signal of periodic amplitude in the pathway position winding indicative of position of the vehicle on the pathway.

35. The system of claim 1, wherein said pathway conductor sets and said vehicle conductor sets couple the first and the second signals across a common flux gap, a flux pattern formed by a signal in the first conductor sets forms self-canceling currents in the second conductor sets and vice-versa.

36. The system of claim 1, wherein the first vehicle conductor set comprises a figure eight winding, the first pathway conductor set is arranged with respect to the first vehicle conductor set to facilitate determining a position of the vehicle.

37. The system of claim 36, wherein the first pathway conductor set comprises a winding having a periodically alternating current sense.

38. The system of claim 37, wherein the first signal is a position indicating signal.

39. The system of claim 37, wherein a signal in the figure eight winding induces in the first pathway conductor set a periodically alternating signal as the vehicle travels along the way.

40. The system of claim 39, wherein the periodically alternating signal is indicative of a position of the vehicle on the way.

41. A system for transfer of electrical signals with a movable vehicle, the system comprising
   first, second and third pathway conductor sets disposed along a way upon which the vehicle travels,
   first, second and third vehicle conductor sets carried by the vehicle,
   said first pathway conductor set and said first vehicle conductor set being inductively coupled with respect to a first signal,
   said second pathway conductor set and said second vehicle conductor set being inductively coupled with respect to a second signal,
   said third pathway conductor set and said third vehicle conductor set being inductively coupled with respect to a third signal,
   at least one of said pathway conductor sets and said vehicle conductor sets being arranged with a spatial pattern so as to substantially prevent coupling of the first signal with the second and third conductor sets.

42. The system of claim 41, comprising a circuit board having thereon conductors defining at least one of the pathway conductor sets and the vehicle conductor sets.

43. The system of claim 42, wherein said conductors of said circuit board are formed in formed in said spatial pattern.

44. The system of claim 41, wherein
   said vehicle is driven by a linear synchronous motor, and
   said vehicle conductor sets includes windings on a circuit board that fits in registration with a magnet structure of said linear motor so that the windings are aligned with respect to the magnet structure to enhance inductive coupling of signals therein.

45. A vehicular signal transfer system for transferring signals between a pathway and a vehicle moving on the pathway, such system comprising
   a pathway conductor sets having a pattern of conductors fixedly disposed and extending along the pathway,
   a vehicle transducer mountable on the vehicle to inductively couple with the pathway conductor sets to transfer electromagnetic energy therebetween, and
   at least a portion of said pathway conductor sets or said vehicle transducer being formed with a circuit board having a lead pattern of distinct windings arranged with a topology or symmetry effective to inductively couple plural distinct types of signals while avoiding crosstalk therebetween.

46. The vehicular signal transfer system of claim 45, wherein said lead pattern includes a winding having turns of opposed sense disposed adjacent to each other in a direction of travel.

47. The vehicle signal transfer system of claim 45, wherein said pathway conductor sets includes parallel zig-zag conductors.

48. The vehicle signal transfer system of claim 45, wherein said lead pattern includes parallel lines effective for power transmission.

49. The vehicle signal transfer system of claim 45, wherein said lead pattern includes current conducting wires affixed to the circuit board.

50. The vehicle signal transfer system of claim 45, wherein said pathway conductor sets includes a spatially periodic pattern implemented by placing plural identically-patterned circuit boards along the pathway.

51. The vehicle signal transfer system of claim 45, wherein said lead pattern includes a spatially periodic pattern implemented on a board by precision lithography.

52. The vehicle signal transfer system of claim 45, wherein the vehicle includes a linear motor having a magnet member, and the circuit board includes a loop and is shaped to position said loop with respect to the magnet member for enhanced inductive signal coupling with the pathway conductor.

53. The vehicle signal transfer system of claim 45, wherein the pathway forms a flux gap, and the circuit board is carried by the vehicle to move within said flux gap and to position a conductive, loop across flux in the gap.

54. The vehicle signal transfer system of claim 45, wherein the vehicle and pathway form a linear motor having phased power windings fixed along the pathway and a magnet member fixed on the vehicle, and the circuit board includes a loop configured for periodic phased juxtaposition to the power windings to induce position signals.

55. The vehicle signal transfer system of claim 54, wherein the loop is a resonant loop.

56. The vehicle signal transfer system of claim 45, wherein the circuit board includes a power bus formed as a plurality of conductive lines, wherein the lines are parallel and spaced apart to minimize eddy current loss.

57. A signal transfer system for a pathway vehicle, such vehicle being of the type powered by a linear motor for moving along a fixed pathway, and wherein the pathway carries a plurality of spatially offset current lines for driving the linear motor, said signal transfer system comprising a transducer carried on the vehicle and having a plurality of conductors for coupling at least two types of signals selected from among power, position and data communication signals, wherein the plurality of conductors form separate windings for coupling each type of signal and the separate windings are spatially disposed for inductively coupling said signals while canceling induced crosstalk signals therebetween.

58. A signal transfer system for coupling signals along a pathway with a vehicle, the vehicle being powered by a linear motor for moving along the pathway, and the pathway includes a current line for driving the linear motor, wherein the signal transfer system includes a circuit board positioned on the pathway or carried on the vehicle and having two or more distinct conductor patterns effective to inductively couple distinct signals between the vehicle and the pathway, the distinct patterns being disposed to generate and intercept mutually canceling fluxes so the distinct signals are non-interfering.

59. The signal transfer system of claim 58, wherein a first circuit board is formed to provide a spatially periodic pattern of conductive leads along the pathway in precise locations, and a second circuit board is formed with an array of windings configured to position the array for inductive coupling to the first circuit board, the array of windings including a first winding pattern coupling a position signal, and a second winding pattern that couples a data signal and null couples the position signal.

60. The signal transfer system of claim 58, wherein a circuit board is carried on the vehicle on the pathway and having a communication winding, being configured with a spatial symmetry to minimize deleterious coupling of signal and power lines.

61. A vehicular signal transfer system for transferring signals between a pathway and a vehicle moving on the pathway, such system comprising     a pathway conductor sets having a pattern of conductors fixedly disposed and extending along the pathway,     a vehicle transducer mountable on the vehicle to inductively couple with the pathway conductor sets for communication of electrical signal energy therebetween, and     said vehicle transducer and said pathway conductor sets each including plural distinct conductors configured to couple to corresponding plural distinct types of signals with said pathway conductor sets by inductive coupling across a common gap.

62. The vehicular signal transfer system of claim 61, wherein at least a portion of said pathway conductor sets and said vehicle transducer includes a coupling element containing a paramagnetic or ferromagnetic material.

63. The vehicular signal transfer system of claim 61, wherein at least a portion of said pathway conductor sets includes a least part of a stator motor winding of a linear motor.

64. The vehicular signal transfer system of claim 61, wherein the pathway conductor sets and vehicle transducer inductively couple at least two types of signals selected from among position-indicating signals, data-commutating signals and power signals by coupling between corresponding sets position-, data-, or power-conductors in said sets and transducer, wherein the corresponding sets have a topology to defeat induction of crosstalk between different types of signals.

65. The vehicular signal transfer system of claim 64, wherein the pathway conductor sets and vehicle transducer inductively couple at least power signals and data signals.

66. The vehicular signal transfer system of claim 64, wherein the pathway conductor sets and vehicle transducer inductively couple at least power signals and position signals.

67. The vehicular signal transfer system of claim 66, wherein power signals and data signals are coupled in different frequency bands, and further including a passband filter for reducing crosstalk.

68. The vehicular signal transfer system of claim 67, wherein the pathway conductor includes phase windings for coupling the position signals, and the vehicle transducer includes a figure-of-eight winding and a data loop winding around the figure-of-eight winding to effectively to couple data,signals and position signals across a common region.

69. The vehicular signal transfer system of claim 61, wherein at least one of the pathway conductor sets and vehicle transducer is implemented with a pattern of conductive leads on a board.

70. The vehicular signal transfer system of claim 69, wherein the board is in the pathway conductor sets and includes a serpentine winding pattern of conductive leads for position signal coupling.

71. The vehicular signal transfer system of claim 70, wherein the board is in the vehicle transducer and includes figure-of-eight pattern of conductive leads surrounded by a loop conductor to inductively couple at least position signals and data signals.

72. The vehicular signal transfer system of claim 69, wherein the system couples position, data and power and prevents cross-coupling of different signals by arranging topology and dimensions of conductors to be non-interfering.

73. The vehicular signal transfer system of claim 72, wherein signals of different type are of different frequency, and further comprising at least one blocking circuit elements for enhanced separation or processing of induced signals.

74. A vehicular signal transfer system for transferring signals between a pathway and a vehicle moving on the pathway, such system comprising     a pathway conductor sets having a pattern of conductors fixedly disposed and extending along the pathway,     a vehicle transducer mountable on the vehicle to inductively couple with the pathway conductor sets for communication of electrical signal energy therebetween, and     said vehicle transducer and said pathway conductor sets each including plural distinct conductors configured to couple to corresponding plural distinct types of signals with said pathway conductor sets by inductive coupling across a common gap, and at least one of said assemblies being formed as a circuit board.

75. The vehicular signal transfer system of claim 74, wherein the board interfits with magnetic pole elements of a linear motor to define flux regions of inductive coupling between the a pathway conductor sets and vehicle transducer.

76. A system for transfer of electrical signals with a movable vehicle, the system comprising     first, second and third pathway conductor sets disposed along a way upon which the vehicle travels,     first, second and third vehicle conductor sets carried by the vehicle,     said first pathway conductor set and said first vehicle conductor set being inductively coupled with respect to a first signal,     said second pathway conductor set and said second vehicle conductor set being inductively coupled with respect to a second signal,     said third pathway conductor set and said third vehicle conductor set being inductively coupled with respect to a third signal,     at least one of said pathway conductor sets and said vehicle conductor sets being arranged with a spatial pattern so as to substantially prevent coupling of at least one of the first, second and third signals with
    the second and third conductor sets,
    the first and third conductor sets, and
    first and second conductor sets, respectively.

\* \* \* \* \*